US012794336B2

(12) United States Patent
Baruschka et al.

(10) Patent No.: US 12,794,336 B2
(45) Date of Patent: Nov. 10, 2026

(54) BRAKE ADJUSTER FOR A MODULAR MULTILEVEL CONVERTER

(71) Applicant: Innomotics GmbH, Nüremberg (DE)

(72) Inventors: Lennart Baruschka, Wedemark (DE); Dennis Karwatzki, Zirndorf (DE)

(73) Assignee: Innomotics GmbH, Nuremberg (DE)

( * ) Notice: Subject to any disclaimer, the term of this patent is extended or adjusted under 35 U.S.C. 154(b) by 171 days.

(21) Appl. No.: 18/729,412

(22) PCT Filed: Nov. 2, 2022

(86) PCT No.: PCT/EP2022/080492
§ 371 (c)(1),
(2) Date: Jul. 16, 2024

(87) PCT Pub. No.: WO2023/134895
PCT Pub. Date: Jul. 20, 2023

(65) Prior Publication Data

US 2025/0119049 A1 Apr. 10, 2025

(30) Foreign Application Priority Data

Jan. 17, 2022 (EP) .................................... 22151801

(51) Int. Cl.
*H02M 5/458* (2006.01)
*H02M 1/00* (2006.01)

(52) U.S. Cl.
CPC ......... *H02M 1/0003* (2021.05); *H02M 5/458* (2013.01)

(58) Field of Classification Search
CPC ............................ H02M 1/0003; H02M 5/458
See application file for complete search history.

(56) References Cited

U.S. PATENT DOCUMENTS

| | | | | |
|---|---|---|---|---|
| 12,438,481 | B2 * | 10/2025 | Hofmann | H02M 7/4835 |
| 2008/0197966 | A1 | 8/2008 | Sommer | |
| 2021/0025381 | A1 | 1/2021 | Orfanoudakis et al. | |
| 2022/0130628 | A1 | 4/2022 | Köllensperger | |

FOREIGN PATENT DOCUMENTS

| | | | |
|---|---|---|---|
| CN | 104821712 | A | 8/2015 |
| CN | 110460228 | A | 11/2019 |

(Continued)

OTHER PUBLICATIONS

Qi, Lei et al: "A Low-Cost DC Chopper With Coupling Transformer for Offshore Wind VSC-HVdc System"; IEEE Transactions on Power Electronics, Institute of Electrical and Electronics Engineers, USA; vol. 37, No. 5, Dec. 14, 2021 (Dec. 14, 2021), pp. 4979-4984, XP011898211.

(Continued)

*Primary Examiner* — Adolf D Berhane
(74) *Attorney, Agent, or Firm* — Henry M Feiereisen, LLC

(57) ABSTRACT

A brake adjuster for a modular multilevel converter includes a plurality of submodules, a first switching group including at least one of the plurality of submodules, a second switching group including at least another one of the plurality of submodules, and a resistor. The first switching group is arranged between the resistor and a first connection point and the second switching group is arranged between the resistor and a second connection point such that the resistor and the first and second switching groups form an electrical series circuit between the first connection point and the second connection point. Any further one of the plurality of submodules is arranged in the first switching group or in the second switching group.

14 Claims, 4 Drawing Sheets

(56) References Cited

FOREIGN PATENT DOCUMENTS

| | | | | | |
|---|---|---|---|---|---|
| CN | 110768555 | A | | 2/2020 | |
| CN | 211908648 | U | | 11/2020 | |
| DE | 101 03 031 | A1 | | 7/2002 | |
| EP | 2 777 127 | A1 | | 9/2014 | |
| EP | 3 195 440 | B1 | | 5/2016 | |
| EP | 1 917 712 81 | | | 10/2018 | |
| EP | 3 691 067 | A1 | | 8/2020 | |
| EP | 3 826 165 | A1 | | 5/2021 | |
| WO | WO-2025193431 | A1 | * | 9/2025 | .......... H02M 3/1582 |

OTHER PUBLICATIONS

Proceedings of the 2011 14th European Conference on Power Electronics and Applications, European Conference on Power Electronics and Applications, S. Schoening, P. K. Steimer and J. W. Kolar, "Braking chopper solutions for Modular Multilevel Converters" 2011, pp. 1-10; 2011.

IEEE Transactions on Power Electronics, vol. 33, No. 6, "Performance of a Distributed Dynamic Brake for an Induction Motor Fed by a Modular Multilevel DSCC Inverter," Y. Okazaki, S. Shioda and H. Akagi, I, Jun. 2018, doi: 10.1109/TPEL.2017.2737878: pp. 4796-4806; 2018.

PCT International Search Report and Written Opinion of International Searching Authority mailed on Jan. 26, 2023 corresponding to PCT International Application No. PCT/EP2022/080492 filed on Nov. 2, 2022.

Andre Birkel et al.: Analysis and semiconductor based comparison of energy diverting converter topologies for HVDC transmission systems, in: 2015 17*th* European Conference on Power Electronics and Applications, Sep. 8, 2015, pp. 1-10.

* cited by examiner

BRAKE ADJUSTER FOR A MODULAR MULTILEVEL CONVERTER

CROSS-REFERENCES TO RELATED APPLICATIONS

This application is the U.S. National Stage of International Application No. PCT/EP2022/080492, filed Nov. 2, 2022, which designated the United States and has been published as International Publication No. WO 2023/134895 A1 and which claims the priority of European Patent Application, Serial No. 22151801.2, filed Jan. 17, 2022, pursuant to 35 U.S.C. 119 (a)-(d).

BACKGROUND OF THE INVENTION

The invention relates to a brake adjuster for a converter with a DC-link having a resistor, a switching group with submodules and also a first connection point and a second connection point. The invention furthermore relates to a modular multilevel converter comprising such a brake adjuster. The invention also relates to a converter assembly having such a modular multilevel converter and a feed device. In addition, the invention relates to a method for operating such a brake adjuster or such a modular multilevel converter or such a converter assembly.

In various applications of converters with a DC-link, in particular with a voltage source converter, and modular multilevel converters, a brake adjuster is advantageous for converting electrical energy into heat. A typical example is the operation of a motor with a modular multilevel converter fed by a diode rectifier. If braking operation is to be provided in this configuration, a brake adjuster is commonly used. But also in regenerative configurations that can feed braking energy from the motor back into a power supply network, for example with two modular multilevel converters connected via the DC-link, i.e. connected on the DC voltage side, a brake adjuster can be advantageous if, for example, the braking operation of a motor is required with a simultaneous power failure.

The modular multilevel converter is disclosed in DE 101 03 031 A1. This converter has submodules with which a finely graduated AC voltage can be generated from a DC voltage.

Typically, such a brake adjuster for a modular multilevel converter is implemented with a central resistor, also known as a brake resistor. Alternatively, solutions with several brake resistors distributed across the submodules of the modular multilevel converter are possible. One of the possible solutions for implementing a brake adjuster with a central brake resistor is disclosed in EP 1 917 712 B1.

A pulsed resistor is known from EP 1 917 712 B1. This pulsed resistor relates to an application for a converter in the higher voltage and power range. This pulsed resistor has at least two two-pole subsystems and a resistor element, with these subsystems and the resistor element being electrically connected to each other in series. This results in a pulsed resistor with which a braking current can be finely controlled and which can be adapted to any medium voltage with simple means.

The resistor of the brake adjuster, also known as the brake adjuster resistor, is connected in series with several submodules of the modular multilevel converter to form a brake adjuster branch, also referred to simply as the brake adjuster. Apart from the SINAMICS PERFECT HARMONY GH150 and SINAMICS PERFECT HARMONY SH150 products, such a configuration is also known from the publication "Braking chopper solutions for Modular Multilevel Converters" (S. Schoening, P. K. Steimer and J. W. Kolar, Proceedings of the 2011 14th European Conference on Power Electronics and Applications, 2011, pp. 1-10.) and "Performance of a Distributed Dynamic Brake for an Induction Motor Fed by a Modular Multilevel DSCC Inverter," (Y. Okazaki, S. Shioda and H. Akagi, in IEEE Transactions on Power Electronics, Vol. 33, No 6, pp. 4796-4806 June 2018, doi: 10.1109/TPEL.2017.2737678). In these configurations, one of the two poles of the brake resistor is directly connected to one of the two conductors of the DC-link, i.e. to a connection point of the brake adjuster.

To operate the brake adjuster, the averaged current through the brake adjuster, also known as the brake adjuster current, is set, for example, by pulse width modulation. For this purpose, the series-connected submodules, designed as a half bridge, for example, are either in the "On" state (submodule capacitor is connected to the connection points of the submodule) or the "Off" state (connection points of the submodule are short-circuited). If the submodules or at least some of the submodules are in the "Off" state, depending on the DC-link voltage, the number of submodules switched off and the resistance value of the brake resistor, a current flows through the brake adjuster branch. To control or regulate the current, individual submodules can be switched on (increasing the brake adjuster current) or switched off (reducing the brake adjuster current).

A series circuit is defined as a circuit of components through which the same current flows. The series circuit of partial impedances acts as a single two-pole circuit with an impedance that corresponds to the sum of the partial impedances.

The object of the invention is to improve a brake adjuster, particularly with regard to its usability in a converter.

SUMMARY OF THE INVENTION

This object is achieved by means of a brake adjuster as set forth hereinafter. This object is further achieved by means of a modular multilevel converter as set forth hereinafter. In addition, this object is achieved by means of a converter assembly as set forth hereinafter. This object is also achieved by means of a method as set forth hereinafter.

Advantageous embodiments of the invention are stated in the dependent claims.

Among other things, the invention is based on the realization that the design of a brake adjuster can be improved in that in a series circuit of submodules and brake resistor the submodules are arranged on both sides of the brake resistor between the brake adjuster connection points. This makes it possible to reduce the maximum voltage occurring within the brake adjuster or within a converter comprising such a brake adjuster. This also reduces the insulation requirements for the brake adjuster or the corresponding converter. The submodules of the brake adjuster are also referred to as brake adjuster submodules.

The transition between the two switching states (ON and OFF) in normal operation of the brake adjuster is carried out, for example, by sequential switching of the submodules in order to avoid high voltages within the brake adjuster or the converter. To enable simultaneous switching of all submodules, a design suited to high insulation voltages is required. Due to insulation distances, the converter dimensions are correspondingly large.

If the submodules are set to the ON state, the maintained current due to the inductances present, in particular due to the inductive behavior of the cables and the brake resistor, brings about the charging of the submodule capacitors of the brake adjuster's submodules. Depending on the parameters of the components, the number of submodules of the brake adjuster and the delay during staggered switching, this results in operating states in which the voltage provided by the series-connected brake adjuster submodules is higher than the DC-link voltage. Since the highest voltage occurring in the inverter is also taken into account for the insulation requirements, for example according to IEC 61800-5-1, such operating states increase the insulation requirements. This consideration is independent of the structure of the submodules and applies in particular to other structures such as double modules and full-bridge modules in addition to the half-bridge module structure.

In the proposed design, the brake resistor is not connected directly with one of its two poles to one of the connection points of the brake adjuster, i.e. to the DC-link. Instead, the submodules of the brake adjuster are divided into two groups of submodules connected in series. These two groups are referred to as the first and second switching groups. The brake resistor is then connected within the brake adjuster between these two groups of submodules.

The behavior of the brake adjuster with its submodules is virtually unchanged in terms of the ability to be controlled and regulated in this setup and the sum of the voltages provided by the submodules can still be greater than the DC-link voltage provided by the converter, in particular of a modular multilevel converter. This negative voltage across the brake resistor results in a current through it and therefore also in a reduction in the voltage between two points on different sides of the resistor. This means that the voltage with the greatest drop between two points of the converter is still the DC-link voltage, or the increase in the voltage with the greatest drop between two points compared to the DC-link voltage is lower than with the already known arrangement of the brake adjuster.

Compared to the previous connection, with the connection of the brake resistor proposed here, the insulation requirements are reduced due to the operating conditions described above. This results in a higher possible brake adjuster performance for existing products and their insulation coordination or, depending on the boundary conditions, makes brake adjuster operation possible in the first place. An increase in the maximum permissible DC-link voltage is also possible. For future products, the lower insulation requirements enable a reduction in costs due to smaller distances to be maintained and lower requirements being placed on the components used. If the voltages occurring during the described operation of the brake adjuster are taken into account, the requirements with regard to clearances and partial discharge extinction voltage in accordance with IEC 61800-5-1 in particular can be implemented in a simpler, more space-saving and cost-effective manner.

The modular multilevel converter can have a large number of phase modules. It has proven to be particularly advantageous for connection to three-phase grids or three-phase electrical machines if the modular multilevel converter has precisely three phase modules. To increase performance, it also makes sense if the number of phase modules is a multiple of three. The phase modules are arranged electrically in parallel with regard to their DC voltage connection points. The DC voltage connection points form the DC-link of the modular multilevel converter.

The brake resistor is particularly advantageously used in the modular multilevel converter if the latter cannot feed electrical energy back into a power supply network. This is the case, for example, with the converter assembly in which the feed device is formed by one or more diode rectifiers and therefore does not allow the direction of energy flow to be reversed. In this case, the electrical energy generated by braking a drive is converted into heat by the resistor of the brake adjuster. This enables wear-free braking of the drive, in particular a motor of the drive, in which the modular multilevel converter of the drive can be designed to be particularly compact and cost-effective.

This results in the possibility of very highly dynamic operation. With the proposed design, it is possible to switch on all submodules simultaneously to quickly reduce the current through the brake resistor without generating inadmissibly high voltages in the converter. There are also no increased insulation requirements for such operation, as the voltages arising during highly dynamic operation, especially when all submodules are switched on simultaneously, are uncritical in the proposed design.

Apart from the submodules, the switching groups have no further resistor that makes a significant contribution to the conversion of electrical energy into heat compared to the resistor arranged between the first switching group and the second switching group. The switching groups contribute only slightly to the conversion of electrical energy into heat, for example through switching losses of the semiconductors, balancing resistors of the capacitors, etc. Unlike the resistor, which is located between the first switching group and the second switching group, in this heat generation what these components have in common is that they are parasitic or have a function other than the conversion of electrical energy into heat. In this sense, the switching groups can be described as resistance-free.

The arrangement of the resistor between the first switching group and the second switching group has proven to be advantageous, as the resistor is often arranged spatially separated from the switching groups. Due to the spatial separation, the environment for the switching group, for example inside a building to protect it from environmental influences, and for the resistor, for example outdoors to better dissipate heat to the surroundings, can be optimized independently of each other.

Other than the first and second switching groups, the brake adjuster has no further switching group. In other words, the brake adjuster has precisely two switching groups, with the switching groups not contributing significantly to the conversion of electrical energy into heat.

In an advantageous embodiment of the invention, the first and second switching groups each have at least two submodules, the submodules of the respective switching group being arranged electrically in series. The number of submodules in the individual switching groups can be increased so that the brake adjuster can also be used for converters with a higher DC-link voltage. The number then results from the level of the DC-link voltage and the voltage blocking capacity of the semiconductors used in the submodules, taking into account the overvoltages that occur in the brake adjuster submodules due to operation. In addition, it may be useful to increase the number of submodules for redundancy reasons, so that the brake adjuster remains operational even if one or more submodules fail. It may also be advantageous to increase the number of submodules in order to provide a greater discharging current for the modules and thus reduce the minimum time required in the ON state.

It has proven to be advantageous to select the same number of submodules for the first switching group and the second switching group, for a maximum reduction in the highest occurring voltage. Alternatively, it is also possible to define and optimize the number of submodules per switching group according to other criteria, such as the available installation space.

In a further advantageous embodiment of the invention, the first switching group and the second switching group are each designed to be resistance-free. In this context, resistance-free means that there is no significant conversion of electrical energy into heat by the switching groups compared to the resistor arranged between the first switching group and the second switching group. Only operational losses are present in the switching groups. This means that the entire part of the brake adjuster that is relevant for the conversion into heat is located between the two switching groups. This makes it particularly easy to arrange the resistor separately from the other components of the brake adjuster. In the case of an outdoor installation being arranged outdoors, outside of a building, for example, only two supply lines are required. This means that this spatial separation for optimum heat dissipation can be easily implemented.

In a further advantageous embodiment of the invention, the brake adjuster has precisely two connection points corresponding to the first connection point and the second connection point. By its very definition as a series circuit, the brake adjuster has precisely two connection points. There are no other connection points, for example for connection to a ground potential. It has been found that such a further connection point is not necessary to reduce the requirements regarding the insulation voltage.

In a further advantageous embodiment of the invention, the resistor comprises a plurality of partial resistors. Since the resistor can convert a comparatively high amount of electrical energy into heat, it has proven advantageous to implement this resistor by means of a large number of partial resistors arranged in series and/or parallel. These can be cooled separately or at least spaced apart to ensure good cooling or heat dissipation.

In an unclaimed embodiment, the brake adjuster has a third switching group and a further resistor, with the third switching group having at least one submodule, with the further resistor and the third switching group being arranged in a further series circuit, and with the further series circuit being arranged between the second switching group and the second connection point and being arranged electrically in series with the series circuit. This structure makes it possible to further reduce the occurring voltages, which are decisive for the insulation requirements within the resistor structure. By spreading these across several resistors and switching groups, they can be arranged flexibly in the converter simultaneously and thus take into account the structural requirements, so that the converter can be manufactured particularly compactly in terms of its size. In addition, the components can be distributed in the converter with the flexibility to make them particularly easy to access. This ensures good maintainability despite the small dimensions of the converter.

It is particularly advantageous if the third switching group is electrically connected directly to the second connection point of the brake adjuster. In this case, the further resistor is then connected directly to the second switching group. If this arrangement is represented in an electrical equivalent circuit diagram, the parasitic inductances could be represented by one or more inductances at each point of the series circuit or the further series circuit. The voltages generated at the parasitic inductances by the current driven by the parasitic inductances do not then have a negative effect on the design of the brake adjuster.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figure 1:
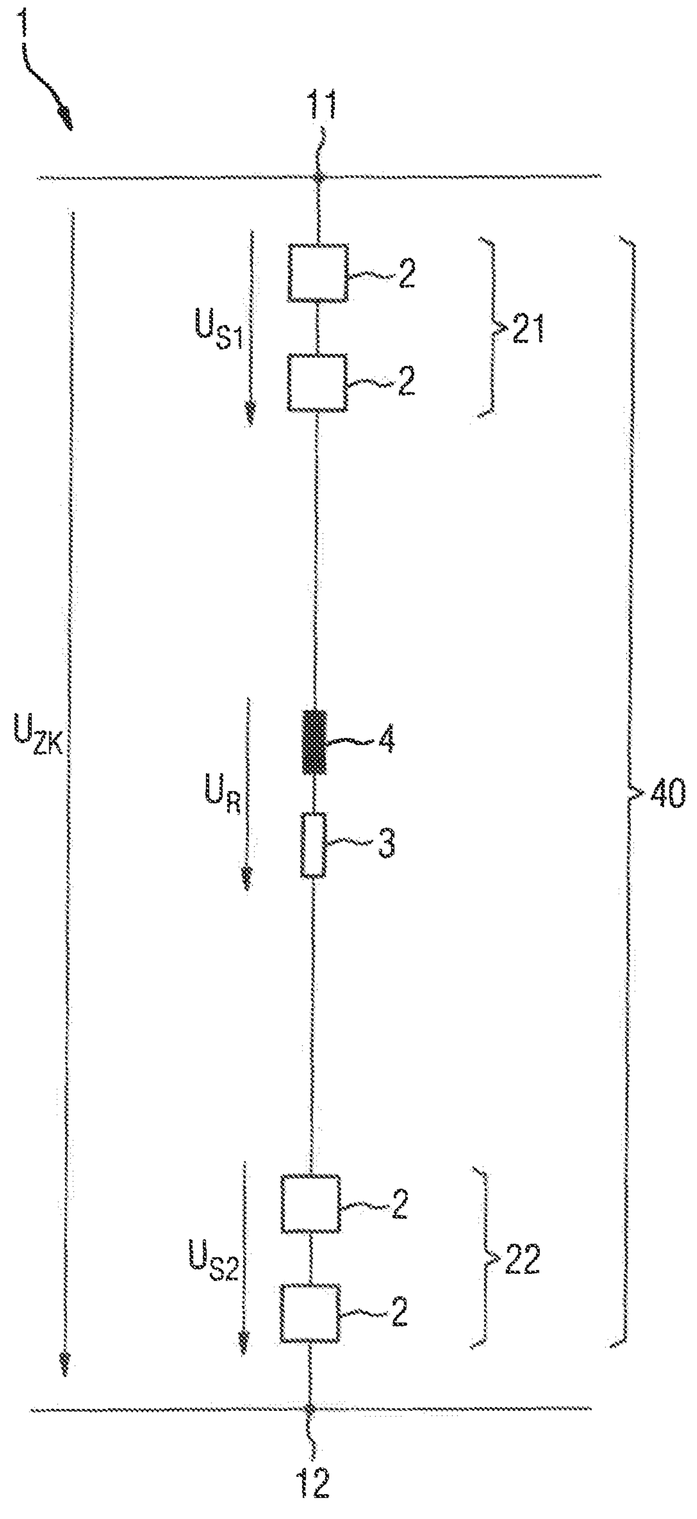
FIGS. 1 and 2 show exemplary embodiments of a brake adjuster.

FIG. 1 shows a first exemplary embodiment of a proposed brake adjuster 1. A first switching group 21 of submodules 2, a second switching group 22 of submodules 2 and a resistor 3 are arranged between a first connection point 11 and a second connection point 12 of the brake adjuster 1. These elements form an electrical series circuit 40. The submodules 2 of the respective switching group 21, 22 are arranged electrically in series. The voltage $U_{S1}$ or $U_{S2}$ is applied via the respective switching group 21, 22. The inductive behavior of the resistor 3 and the electrical connections, for example through the cables running to the resistor 3, is reflected in the parasitic inductance 4. This is hence shown in the immediate vicinity of the resistor 3. This involves a parasitic electrical behavior of the resistor 3 and/or the connecting cables.

The number of submodules 2 of the respective switching groups 21, 22 can assume any value greater than or equal to one. The number of submodules 2 of the respective switching groups 21, 22 can be the same, for example to keep the maximum occurring voltages $U_{S1}$ and $U_{S2}$ across the switching groups 21, 22 as equal as possible and the overvoltage for the insulation coordination as low as possible. Alternatively, the number of submodules 2 of the respective switching groups 21, 22 can also be different, for example in order to make advantageous use of the available installation space of the converter 5 and to make the brake adjuster 1 as compact as possible. The resistor 3 is arranged between the first switching group 21 and the second switching group 22. Since resistor 3 is located between the first and second switching groups 21, 22, the DC-link voltage $U_{zk}$ must be used to consider the insulation requirements and no longer the sum of the voltage $U_{S1}$ across the first switching group 21 and the voltage $U_{S2}$ across the second switching group 22. This is due to the fact that for such critical operating points, for example when the current is rapidly reduced by the brake adjuster 1, there is a negative voltage drop across the resistor 3 in the direction of the reference arrow of $U_R$. However, by dividing the submodules 2 between the two switching groups, this negative voltage drop does not have a negative effect on the voltages present in the brake adjuster 1 with respect to ground, for example, as the voltages $U_{S1}$ and $U_{S2}$ of the individual switching groups 21, 22 do not add up to a high voltage relevant for the insulation considerations.

This results in a reduction of the voltage relevant for the design of the insulation, without the need for further components, but solely due to the arrangement of the submodules 2 in at least two switching groups 21, 22 in accordance with the invention.

Figure 2:
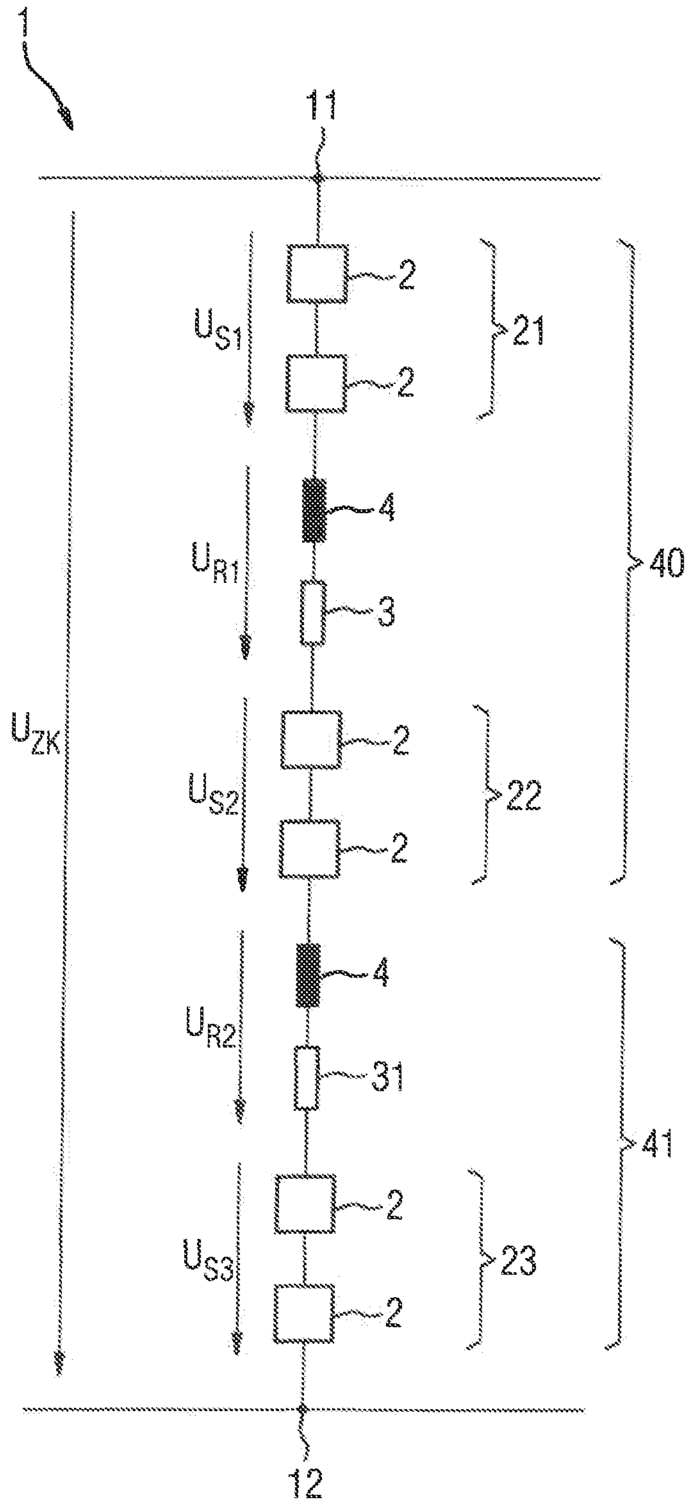

FIG. 2 shows how an arrangement with two switching groups 21, 22 and a resistor 3 can be extended by a third switching group 23 and a further resistor 31. To avoid repetition, reference is made to the description of FIG. 1 and to the reference signs introduced there. To add the third switching group 23 and the further resistor 31, these elements are arranged in a further series circuit 41 and electrically connected in series with the existing series circuit 40. The arrangement is advantageously such that the third switching group 23 in the further series circuit 41 is arranged facing the second connection point 12 of the brake adjuster 1 and the further resistor 31 in the further series circuit 41 is arranged facing the second switching group 22 of the series circuit 40. Thus the voltages $U_{S1}$, $U_{S2}$ and $U_{S3}$ occurring in brake adjuster 1 can be further reduced. This increases the degree of freedom to arrange the resistors 3, 31 and/or the submodules 2 mechanically in the brake adjuster 1 or in the modular multilevel converter 5.

Figure 3:
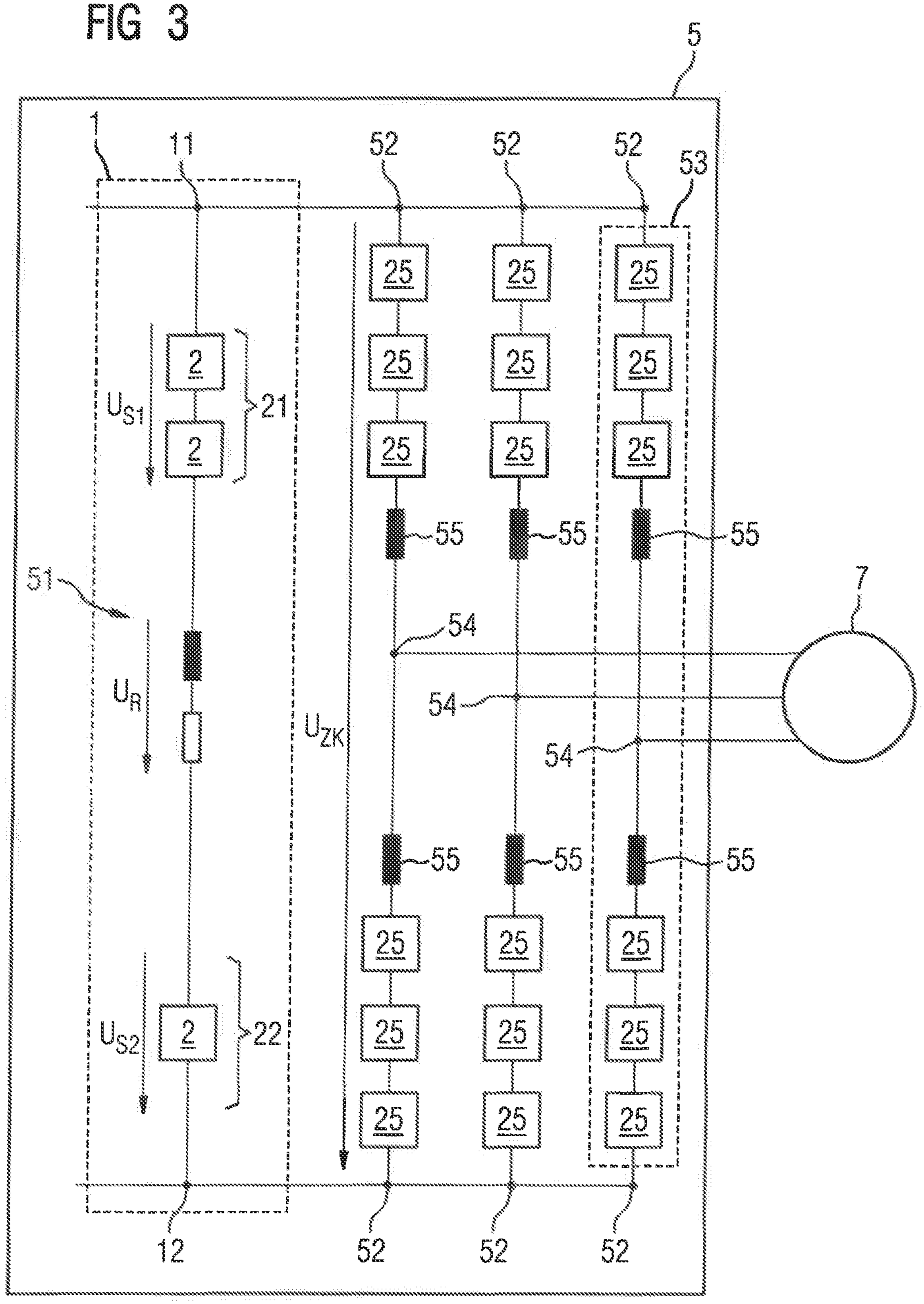
FIG. 3 shows a modular multilevel converter having such a brake adjuster.

FIG. 3 shows a modular multilevel converter 5, which has a brake adjuster 1. The brake adjuster 1 can be designed as shown. Alternatively, it is also possible to design the brake adjuster 1 as in one of the exemplary embodiments of FIG. 1 or 2, for example. Consequently, to avoid repetition, reference is made to the description of FIGS. 1 and 2 and to the reference signs introduced there. The DC-link 51 of the modular multilevel converter 5 is formed by the connection points 11, 12 of the brake adjuster 1 or by the DC voltage connection points 52 of the phase modules 53. The DC-link voltage $U_{ZX}$ is applied between the first connection point 11 and the second connection point 12 of the brake adjuster 1, with the respective DC voltage connection points 52 of the respective phase modules 53 being connected to each other in such a way that the respective phase modules 53 are arranged in a parallel circuit and the brake adjuster 1 is arranged in parallel with the respective phase modules 53 by means of its connection points 11, 12. By using three phase modules 53 of the exemplary embodiment shown, the modular multilevel converter 5 is three-phase with three phase connections 54 and is suitable for supplying a three-phase load, such as a three-phase motor 7. The chokes 55 of the modular multilevel converter 5 serve to improve the ability to control and regulate the currents of the modular multilevel converter 5.

The modular multilevel converter 1 has a large number of further submodules 25 to provide voltages at the phase connection points 54. If the semiconductors of the submodules 2 and the further submodules 25 have the same voltage blocking capability, it has proven to be advantageous if the number of submodules 2 of the brake adjuster 1 corresponds to half the number of further submodules 25 of the modular multilevel converter or is slightly larger, in particular one or two larger. This allows the use of semiconductors and submodules 2, 25 and thus the optimization of the manufacturing costs for the proposed modular multilevel converter 5.

Figure 4:
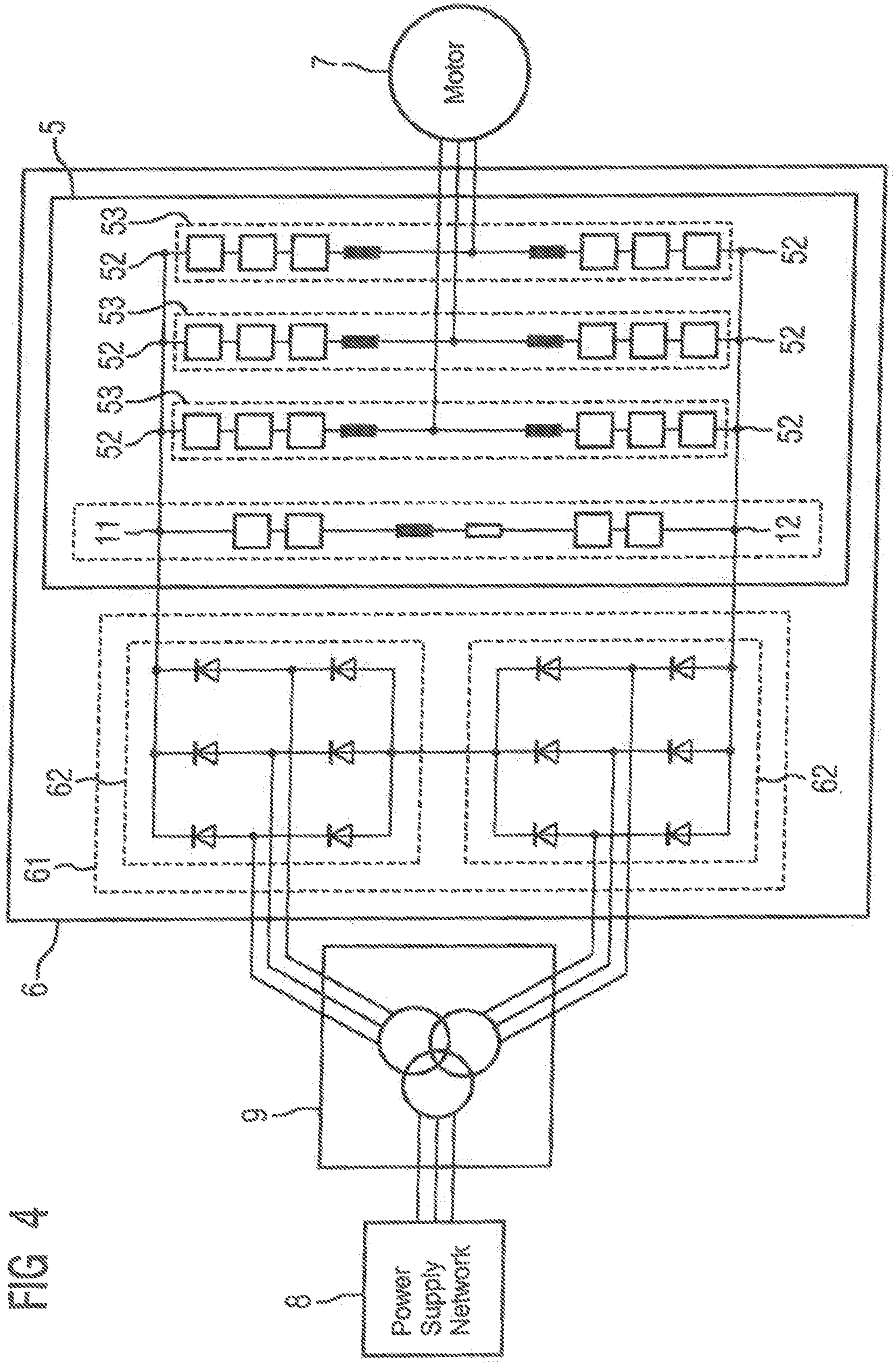
FIG. 4 shows a converter assembly.

FIG. 4 shows a converter assembly 6 with a modular multilevel converter 5 and a feed device 61. To avoid repetition, reference is made to the description of the exemplary embodiments of FIGS. 1 to 3 and to the reference signs introduced there. The feed device 61 is used to supply the modular multilevel converter 5 with electrical energy from a power supply network 8. The feed device is formed highly cost-effectively by two diode rectifiers 62. The diode rectifiers 62 are connected to the power supply network 8 via a transformer 9. On the one hand, the transformer is used to adjust the voltage level between the converter assembly 6 and the power supply network 8 and, on the other hand, to galvanically decouple the diode rectifiers 62 from each other on the AC voltage side.

Although the diode rectifiers 62 do not allow any power reversal, i.e. a feedback of electrical energy from the modular multilevel converter 5 into the power supply network 8, the brake adjuster 1 has the advantage of being able to brake the motor 7 in a regenerative manner, i.e. without wear. For this purpose, the electrical energy generated by the motor 7 in regenerative mode is converted into heat by means of the brake adjuster 1.

In summary, the invention relates to a brake adjuster for a modular multilevel converter, having a resistor, a first switching group, and a first connection point and a second connection point. To improve the usability of the brake adjuster in a converter, it is proposed that the brake adjuster further comprises a second switching group, with the first switching group and the second switching group each comprising at least one submodule, with the first switching group being arranged between the resistor and the first connection point and the second switching group being arranged between the resistor and the second connection point such that the first switching group, the resistor and the second switching group form an electrical series circuit between the first connection point and the second connection point. The invention furthermore relates to a modular multilevel converter comprising such a brake adjuster. The invention also relates to a converter assembly with such a modular multilevel converter and a feed device, with the feed device comprising at least one diode rectifier. Furthermore, the invention relates to a method for operating such a brake adjuster, such a modular multilevel converter or such a converter assembly, with all submodules of the brake adjuster being switched on simultaneously for rapid reduction of a braking current.

The invention claimed is:

1. A brake adjuster for a modular multilevel converter, comprising:
- a plurality of submodules;
- a first switching group comprising at least one of the plurality of submodules;
- a second switching group comprising at least another one of the plurality of submodules; and
- a resistor,
- wherein the first switching group is arranged between the resistor and a first connection point and the second switching group is arranged between the resistor and a second connection point such that the resistor and the first and second switching groups form an electrical series circuit between the first connection point and the second connection point, and
- wherein any further one of the plurality of submodules is arranged in the first switching group or in the second switching group.

2. The brake adjuster of claim 1, wherein the first and second switching groups each have at least two of the plurality of submodules arranged electrically in series.

3. The brake adjuster of claim 1, wherein the first and second switching groups are each designed to be resistance-free.

4. The brake adjuster of claim 1, wherein the first and second connection points are the only connection points of the brake adjuster.

5. The brake adjuster of claim 1, wherein the resistor comprises a plurality of partial resistors.

6. A modular multilevel converter, comprising:
- a brake adjuster comprising a plurality of first submodules, a first switching group comprising at least one of the plurality of first submodules, a second switching group comprising at least another one of the plurality of first submodules, and a resistor, wherein the first switching group is arranged between the resistor and a first connection point and the second switching group is arranged between the resistor and a second connection point such that the resistor and the first and second switching groups form an electrical series circuit between the first connection point and the second connection point, and wherein any further one of the plurality of first submodules is arranged in the first switching group or in the second switching group;

a phase module comprising two DC voltage connection points; and a plurality of further submodules arranged in series between the two DC voltage connection points of the phase module, wherein a connection point between two of the plurality of further submodules forms a phase connection point of the modular multilevel converter, and wherein the first connection point of the brake adjuster is electrically connected to a first one of the two DC voltage connection points of the phase module and the second connection point of the brake adjuster is electrically connected to a second one of the two DC voltage connection points of the phase module.

7. The modular multilevel converter of claim 6, wherein the first and second switching groups of the brake adjuster each have at least two of the plurality of first submodules arranged electrically in series.

8. The modular multilevel converter of claim 6, wherein the first and second switching groups of the brake adjuster are each designed to be resistance-free.

9. The modular multilevel converter of claim 6, wherein the first and second connection points of the brake adjuster are the only connection points of the brake adjuster.

10. The modular multilevel converter of claim 6, wherein the resistor of the brake adjuster comprises a plurality of partial resistors.

11. A converter assembly, comprising:

the modular multilevel converter as set forth in claim 6; and a feed device designed to supply the modular multilevel converter with electrical energy from a power supply network, said feed device comprising a diode rectifier connected to the power supply network.

12. A method for operating the brake adjuster as set forth in claim 1, said method comprising simultaneously switching on the plurality of submodules for rapid reduction of a braking current.

13. The method of claim 12 for operating a modular multilevel converter which comprises the brake adjuster, a phase module comprising two DC voltage connection points, and a plurality of further submodules arranged in series between the two DC voltage connection points of the phase module, wherein a connection point between two of the plurality of further submodules forms a phase connection point of the modular multilevel converter, and wherein the first connection point of the brake adjuster is electrically connected to a first one of the two DC voltage connection points of the phase module and the second connection point of the brake adjuster is electrically connected to a second one of the two DC voltage connection points of the phase module.

14. The method of claim 13 for operating a converter assembly which comprises the modular multilevel converter and a feed device designed to supply the modular multilevel converter with electrical energy from a power supply network and comprising a diode rectifier connected to the power supply network.

* * * * *